US007050392B2

(12) United States Patent
Valdevit

(10) Patent No.: US 7,050,392 B2
(45) Date of Patent: May 23, 2006

(54) IN-ORDER DELIVERY OF FRAMES DURING TOPOLOGY CHANGE

(75) Inventor: Ezio Valdevit, Redwood City, CA (US)

(73) Assignee: Brocade Communications Systems, Inc., San Jose, CA (US)

(*) Notice: Subject to any disclaimer, the term of this patent is extended or adjusted under 35 U.S.C. 154(b) by 959 days.

(21) Appl. No.: 09/972,470

(22) Filed: Oct. 6, 2001

(65) Prior Publication Data
US 2002/0150039 A1 Oct. 17, 2002

Related U.S. Application Data

(60) Provisional application No. 60/280,576, filed on Mar. 30, 2001.

(51) Int. Cl.
*G01R 31/08* (2006.01)
(52) U.S. Cl. ...................... 370/228; 370/216
(58) Field of Classification Search ............ 370/216, 370/217, 218, 219, 220, 221, 222, 223, 224, 370/225, 226, 227, 228, 229, 241, 242, 243, 370/244, 245
See application file for complete search history.

(56) References Cited

U.S. PATENT DOCUMENTS

| | | | | |
|---|---|---|---|---|
| 5,835,482 | A | * 11/1998 | Allen | .................... 370/225 |
| 6,055,228 | A | 4/2000 | DeKoning et al. | ........... 370/258 |
| 6,400,681 | B1 | 6/2002 | Bertin et al. | ................ 370/218 |
| 6,829,215 | B1 | * 12/2004 | Tornar | ........................ 370/223 |
| 6,847,647 | B1 | 1/2005 | Wrenn | .................... 370/395.32 |
| 6,898,189 | B1 | * 5/2005 | Di Benedetto et al. | ..... 370/256 |
| 6,901,048 | B1 | * 5/2005 | Wang et al. | ................ 370/228 |

OTHER PUBLICATIONS

"Fibre Channel Methodologies for Interconnects (FC-MI) Rev 1.8," NCITS Working Draft Proposed Technical Report, Sep. 28, 2001, pp. Start to 11, 41-60.
"Fibre Channel—Fabric Generic Requirements (FC-FG)," American National Standards Institute, Dec. 4, 1996.
"Fibre Channel Physical and Signaling Interface (FC-PH) Rev 4.3," American National Standards Institute Working Draft, Jun. 1, 1994, pp. Start to 32.

* cited by examiner

*Primary Examiner*—Dang Ton
*Assistant Examiner*—Phuc Tran
(74) *Attorney, Agent, or Firm*—Wong, Cabello, Lutsch, Rutherford & Brucculeri, LLP

(57) ABSTRACT

A method and system is provided for in-order delivery of frames in Fiber Channel communication networks during topology change. When a topology change has rendered an old path between two switches or end devices infeasible, a new path is determined to replace the old path. To ensure in-order delivery of frames, the new path is activated only after the lapse of a hold-down period. The hold-down period may be calculated as the maximum time required for frames within the old path immediately prior to the topology change to reach the destination switch or device. The calculation may utilize information available from the Fiber Channel shortest path first (FSPF) protocol.

25 Claims, 5 Drawing Sheets

Routing Table 500

| Destination 502 | Before Failure 504 TX Port | | After Failure 506 TX Port |
|---|---|---|---|
| 402 | 410 | == hold-down ==> | 411 |
| 403 | 411 | | 411 |
| 404 | 410 | == hold-down ==> | 411 |
| 405 | 410 | == hold-down ==> | 411 |
| 406 | 411 | | 411 |
| 407 | 410, 411 | == hold-down ==> | 411 |

FIG. 5(a)

Routing Table 510

| Destination 502 | Before Failure 514 TX Port | | After Failure 516 TX Port |
|---|---|---|---|
| 402 | 410 | == hold-down ==> | 411 |
| 403 | 411 | | 411 |
| 404 | 410, 411 | == hold-down ==> | 411 |
| 405 | 410, 411 | == hold-down ==> | 411 |
| 406 | 411 | | 411 |
| 407 | 411 | | 411 |

FIG. 5(b)

IN-ORDER DELIVERY OF FRAMES DURING TOPOLOGY CHANGE

CROSS REFERENCE TO RELATED APPLICATIONS

This application claims the benefit under 35 U.S.C. § 119(e) of U.S. provisional patent application Ser. No. 60/280,576, entitled "Adaptive Algorithm for In-Order Delivery of Frames During Topology Changes," by Ezio Valdevit, filed Mar. 30, 2001, which is hereby incorporated by reference.

BACKGROUND OF THE INVENTION

1. Field of the Invention

This application relates generally to routing data within a communication network system, and more particularly to managing delivery of frames within a Fibre Channel communication network system during topology changes.

2. Background of the Invention

Continuous advances in technology, particularly in networks such as the Internet, have caused an increasing demand for communication bandwidth. Applications such as transmission of images or video over the Internet and videoconferencing implemented over public telephone networks typically require the high-speed transmission of large amounts of data. Such applications create a need for data centers to be able to quickly provide their servers with large amounts of data from data storage. As such data transfer needs become more prevalent, efficient data storage and management are becoming increasingly important. This data dependence has greatly increased the number of input and output transactions (I/Os) required of computer storage systems and servers.

Fibre Channel is a protocol suite that is well suited to meet this increasing demand. The Fibre Channel family of standards adopted by the American National Standards Institute (ANSI) is one example of a standard which defines a high-speed communication interface for the transfer of large amounts of data via connections between a variety of hardware devices. Such devices may include personal computers, workstations, mainframes, supercomputers, and storage devices. Use of Fibre Channel is proliferating in many applications, particularly those demanding high bandwidth and low latency I/O. Examples of such applications include mass storage, medical and scientific imaging, multimedia communications, transaction processing, distributed computing and distributed database processing applications.

To meet the high performance need, Fibre Channel was designed to incur the minimum amount of host overhead. Understanding that storage requirements are fundamentally different than client/server internetworking requirements, the architects of Fibre Channel built the intelligence and reliability into the hardware instead of leaving it to the software. By managing many concurrent I/O transactions entirely at the hardware level, the processing overhead required to send and receive data is dramatically reduced. Whereas a transport-layer routing protocol such as transmission control protocol (TCP) may take from 50 to 100 percent of a CPU to process, the same data rate via Fibre Channel requires less than 5 percent CPU overhead.

In one aspect of Fibre Channel, the communications between devices is based on the use of a fabric. The fabric is typically constructed from one or more Fibre Channel switches. Each device (or group of devices, for example, in the case of an arbitrated loop) is coupled to the fabric and can communicate with every other device coupled to the fabric.

Fibre Channel devices, such as protocol chips used in host adapters and in storage arrays, require in-order delivery of frames to maintain the cardinality of associated functions. Although frame routing techniques provided with the Fibre Channel standard guarantee that all frames between source and destination ports are delivered in-order internal to the fabric in the absence of topology changes, routing control becomes less straightforward when topology changes take place.

When a topology change occurs, the Fibre Channel network can detect the condition and find a new path, if one is available, typically in less than one second. However, during the process of switching to a new route, frames may be delivered out of order. This may happen because old frames can be enqueued on a congested link in some intermediate switch, so frames subsequently transmitted on the new, non-congested path will reach the destination first.

One popular path selection protocol, called Fabric Shortest Path First (FSPF), identifies the shortest path available to a stream of frames and assign the frames to this shortest path. The method starts running automatically at boot time and requires no configuration. Under FSPF, all the routes are established at boot time and will not change unless there is a topology change, such as a failure, or new links coming on-line that provide an equal or better path to some destinations. When a topology change occurs, FSPF reestablishes all routes affected by the change. However, FSPF does not guarantee that the frames be delivered in order when the adjustment is made. Nevertheless, FSPF does provide an abundance of information which may be used to ensure in-order delivery of frames during the topology change.

Accordingly, what is needed is a method and system to guarantee in-order delivery of frames in Fibre Channel communication networks during topology change. It is also desirable to take advantage of the information readily produced by the Fibre Channel routing protocol, such as FSPF, to optimize and further refine the method and system.

SUMMARY OF THE INVENTION

The present invention provides a system and a method for in-order delivery of frames in Fibre Channel communication networks during topology change. When a topology change has rendered an old path between two switches or end devices infeasible, the old path is deactivated and a new path is determined to replace the old path. To ensure in-order delivery of frames, the new path is activated only after the lapse of a hold-down period.

In one embodiment of the present invention, the hold-down period is calculated, on the fly, as the maximum time required for frames within the old path immediately prior to the topology change to reach the destination switch or device. In many Fibre Channel networks that may beneficially utilize the present invention, this maximum time equals the product of the maximum delay a frame may experience in a switch and the number of intermediate switches within the old path. The latter number is readily available from the Fibre Channel shortest path first (FSPF) protocol as a by-product of path computation.

The features and advantages described in the specification are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF DRAWINGS

FIGS. 5(a) and 5(b) illustrate the modifications to the routing table for a switch shown in FIG. 4 in response to topology changes under two possible scenarios, according to an embodiment of the present invention.

Figure 1:
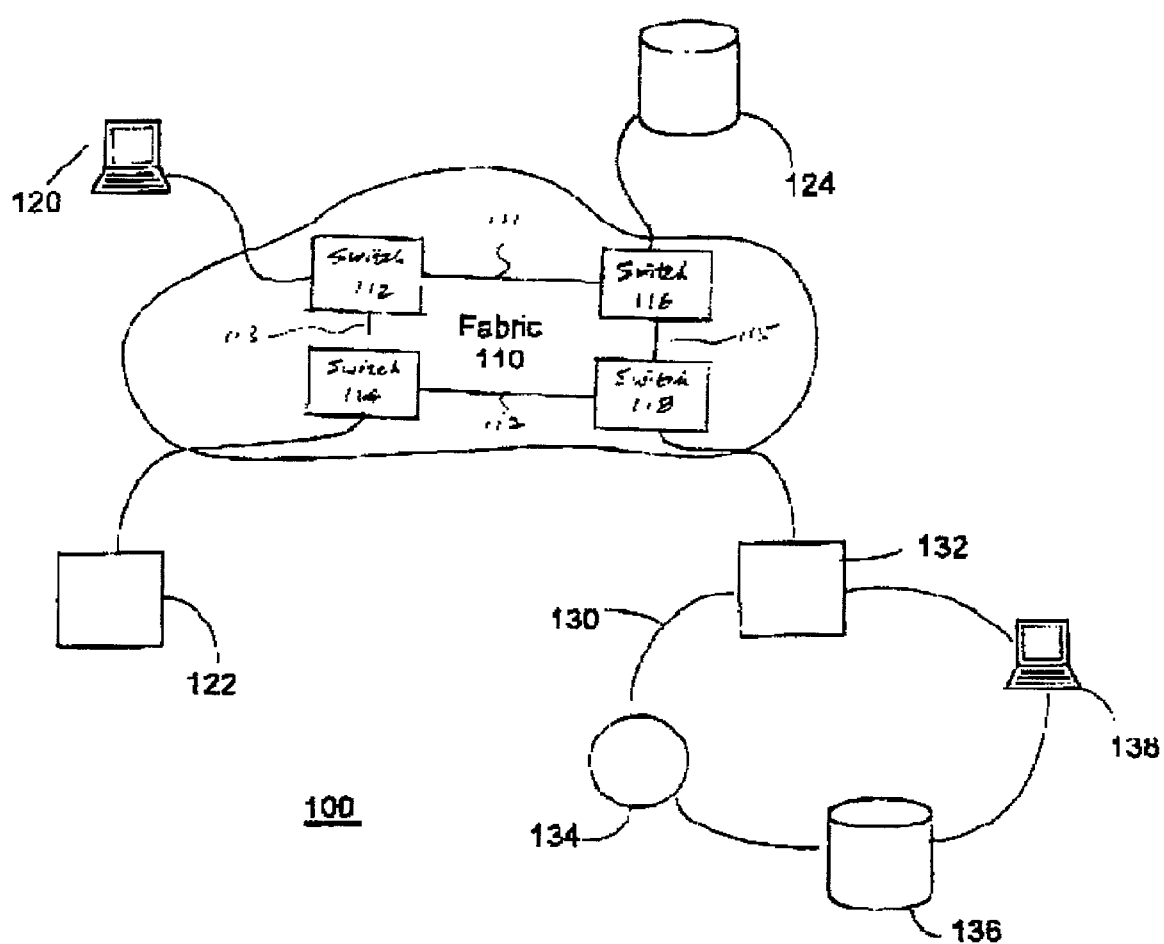
FIG. 1 is a high-level block diagram illustrating a Fibre Channel network that may beneficially utilize the present invention.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION

A system and method for in-order delivery of frames during topology change is described. In the following description, for purposes of explanation, numerous specific details are set forth in order to provide a thorough understanding of the invention. It will be apparent, however, to one skilled in the art that the invention can be practiced without these specific details.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of methods and symbolic representations of operations on data bits within a computer memory. These methods and representations are the means used by those skilled in the data processing arts to most effectively convey the substance of their work to others skilled in the art. A method is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. Unless specifically stated otherwise as apparent from the following discussion, it is appreciated that throughout the description, discussions utilizing terms such as "processing," "computing," "calculating," "determining," "displaying," or the like, refer to the action and processes of a computer system, or similar electronic computing device, that manipulates and transforms data represented as physical (electronic) quantities within the computer system memories or registers or other such information storage, transmission or display devices.

The methods presented herein are not inherently related to any particular computing device or other apparatus. Various general-purpose systems may also be used with programs in accordance with the teachings herein, or it may prove convenient to construct more specialized apparatus to perform the required method steps. The required structure for a variety of these systems will be apparent from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

Reference will now be made in detail to several embodiments of the present invention, examples of which are illustrated in the accompanying drawings. Wherever practicable, the same reference numbers will be used throughout the drawings to refer to the same or like parts.

FIG. 1 is a high-level block diagram of an embodiment of a Fibre Channel communication network system 100 that may contain an embodiment of the process steps and modules of the present invention in the form of one or more computer programs. Some or all process steps and modules of the present invention could be embodied in firmware or hardware, and when embodied in software, could be downloaded to reside on and be operated from different platforms used by real-time network operating systems. The process steps of the present invention entail in-order delivery of frames during topology change in a Fibre Channel communication network such as system 100.

The Fibre Channel communication network system 100 comprises a fabric 110, and a plurality of devices 120, 122, 124, and groups of devices 132, 134, 136 and 138 as indicated with respect to loop 130. In general, fabric 110 is coupled to the various devices 120, 122, 124, and acts as a switching network to allow the devices to communicate with each other. Devices 120, 122, 124 may be any type of device, such as a computer or a peripheral, and are coupled to the fabric 10 using point-to-point topology. As shown in FIG. 1, device 120 represents a terminal providing a user interface to the fabric 110 and device 124 is a database. Fabric 110 is also in communication with logical loop 130. As shown in FIG. 1, arbitrated loop 130 includes devices 132, 134, 136 and 138, which are serially linked together. It is understood that the examples discussed herein are purely illustrative. For example, in FIG. 1, fabric 110 includes four different switches 112, 114, 116 and 118, each connected to an end device 120, 122, 124 or arbitrated loop 130. A person of ordinary skill in the art will recognize that a Fibre Channel fabric may comprise a single switch or a number of switches, each switch having a plurality of ports to which other switches or devices may be coupled. These ports are typically implemented as application specific integrated circuit (ASICs) that may be affixed to hardware components, such as circuit boards and modules accommodating integrated circuits, which may be plugged into or removed from a switch.

Devices are coupled to the fabric via fabric ports on the fabric side. A fabric port (F_Port) supports a point-to-point fabric attachment. A fabric loop port (FL_Port) supports a fabric loop attachment. On the device side, each device coupled to a fabric constitutes a node. A port on a device coupled in a point-to-point topology is a node port (N_Port).

A port on a device coupled in a loop topology is a node loop port (NL_Port). Within the fabric, ports connecting one switch to another switch are referred to as expansion ports (E_Ports). Ports are connected through links, which in this context refer to bidirectional point-to-point serial data channels. In particular, links connecting E_Ports are termed inter-switch links (ISL). In the following description, both ports and links are often referred to without any specification as to their respective particular types. In most cases, it will be readily apparent to one skilled in the art that a variety of ports and links may beneficially utilize the present invention in the described manner. In other cases, one skilled in the art will readily recognize, based on the context of the description, that the described ports or links are of certain particular types.

A topology change occurs often when there is a link failure or when a new link comes on-line that provides an equal or better path to some destinations. Examples of link failure include the loss of communication due to a link being unplugged, and the failure of a transmitter resulting in one-way only communication. In other cases, a topology change may occur simply because of a change in the cost to use a link within an existing path. This is possible if the routing algorithm is based on minimizing the cost for a frame to go from any specific source to any specific destination.

Referring back to FIG. 1, suppose the best path for a frame leaving switch 112 destined for switch 118 comprises links 111 and 115 and goes through switch 116. If link 111 breaks down or faces inflation in cost, the path through switch 16 ceases to be available or cost-effective. Then, a new path comprising links 113 and 117 will need to be established. As a result, switch 118 will be receiving, for a period of time, frames belonging to the same Fibre Channel exchange or sequence from both links 115 and 117. Unless certain steps are followed, there is no guarantee that these frames are delivered in order. The effect of a topology change and the steps according to the present invention that might be taken to avoid delivery out of order are described below.

Figure 2:
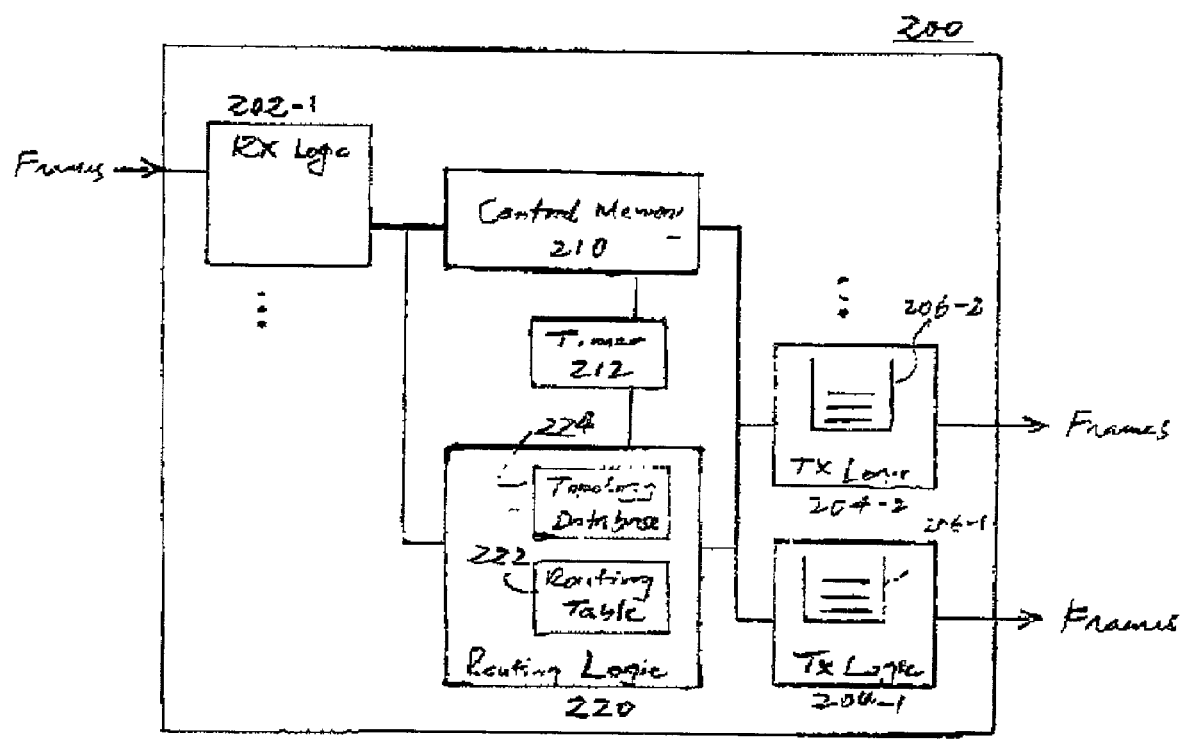
FIG. 2 is a block diagram illustrating a switch that may beneficially utilize the present invention.

FIG. 2 is a block diagram of a switch 200 illustrating the essential components involved in routing frames according to one embodiment of the present invention. Although not explicitly shown, switch 200 is connected to other switches or end devices through its receive (RX) and transmit (TX) ports. For example, switch 200 may take the place of switch 112 in FIG. 1. When a frame enters the switch 200 through an RX port, the corresponding RX logic module 202-1 forwards the frame into storage at the central memory 210, and sends a message to the routing logic 220 where it is determined how the frame should be forwarded. Note that although only one RX logic module is shown, there could be many such modules, corresponding to a plurality of RX ports.

The routing logic 220 employs a routing table 222 to store the available or preferred path or paths for each destination. Once a preferred path is determined from the routing table 222, the frame can be submitted for transmission to the transmit queue 206-1 or 206-2 of the appropriate TX logic module 204-1 or 204-2 corresponding to the TX port leading to the preferred path. Subsequently, the frame is transmitted out of the switch 200 through the corresponding TX port into the selected path that leads to its specified destination.

In one embodiment of the present invention, the routing logic 220 also includes a topology database 224, as illustrated in FIG. 2. The topology database contains information about the connectivity and topology within the Fibre Channel communication network and is notified if a topology change occurs. Based on the topology data in the topology database 224, the routing logic 220 can then select the best available alternative path or paths for the transmission of frames from the switch 200 to any specified destination.

With switch 200 of FIG. 2, when there is a topology change, a stream of data originally routed through TX logic module 204-1, for instance, may have to be rerouted through TX logic module 204-2. To allow this to happen, the routing table 222 must be modified to reflect the new path. Moreover, the outbound queues 206-1 must be deactivated and its entries deleted. Moreover, some frames may have already left switch 200 and are on their way to the destination device via the old path. These frames may be enqueued on a congested link in some intermediate switch within the old path and may take longer to reach the destination than those frames later transmitted via a new, non-congested path. One important aspect of the present invention is to circumvent this potential problem, and this can be achieved if new frames are not forwarded into the new path until a hold-down period has lapsed. The timer 212, shown in FIG. 2, to be coupled with both the central memory 210 and the routing logic 220, can be utilized to enforce the hold-down period. This and other aspects of an adaptive algorithm for in-order delivery of frames during topology change are described next.

Figure 3:
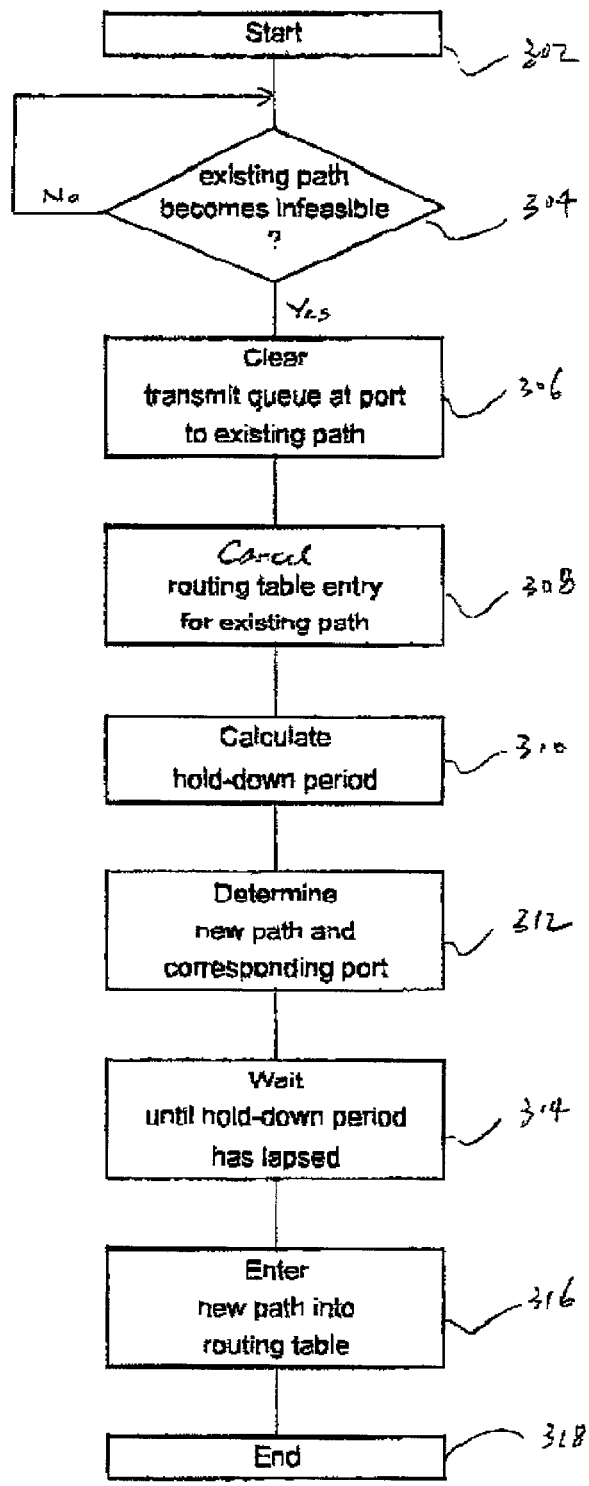
FIG. 3 is a flow chart illustrating the steps for in-order delivery of frames during topology change.

The flowchart in FIG. 3 illustrates the steps of a method for in-order delivery of frames during topology change according to one embodiment of the present invention. This flowchart assumes that all steps are taken within one switch upstream of the topology change. In the following, assume for ease of discussion that this switch is switch 200 shown in FIG. 2. The method is set in motion when it is determined 304 that an existing path becomes infeasible, which may mean unavailable or simply not cost-efficient. The first steps of the method involve clearing 306 the transmit queue to the existing, or "old," path and canceling 308 the routing table entry corresponding to the old path. An example of transmit queue is queue 206-1 in switch 200, in which case the entry in routing table 222 associating the corresponding transmit port to frames directed towards the old path is cancelled 308. The structure of the routing table will be further illustrated below.

As mentioned above, an important aspect of the present invention concerns waiting for a period of time before resuming the transmission of the stream frames affected by the topology change. This hold-down period may be calculated 310 in response to the topology change, as implied by the flowchart of FIG. 3, or it may be pre-determined. The hold-down time may, for example, be set to the maximum time any end device is allowed to wait for a frame before regarding it missing. This maximum allowable time is typically negotiated at the time the network is set up, or renegotiated when an end device is logged onto the network, and is usually less than two seconds. Another alternative, therefore, is to set the hold-down period to two seconds.

Once the old path is deactivated in steps 306 and 308 described above, and the hold-down time is calculated 310, the new path for the frames affected by the topology change is determined 312 next, according to the embodiment of the present invention illustrated in FIG. 3. The determination 312 of the new path includes the selection of the port which leads to the new path. After waiting 314 for the hold-down period to lapse, the new path can then be activated by entering 316 an appropriate entry into the routing table 222. The routing table entry will direct any frames destined for the destination switch or device in question to the new path through the transmit port leading to it, both the path and the port previously determined 312.

Note that the above-discussed steps need not follow the same sequence as indicated in the flowchart of FIG. 3. For instance, one skilled in the art will recognize that it is desirable that the deactivation 306, 308 of the old path, determination 312 of the new path, and calculation 310 of the hold-down period, all be performed as soon as the topology change has rendered an old path infeasible, perhaps in parallel. Hence, the order in which steps 306, 308, 310 and 312 are shown in FIG. 3 is immaterial.

An important aspect of the present invention is that, in guaranteeing that frames are delivered in order, there is no guaranty that all frames will be delivered. While the routing logic 220 waits for the hold-down period to lapse, switch 200 continues to receive frames. Since switch 200 does not forward any frames on the new path for a period of time, frames received during that time are dropped, and so are frames that have already been received but has not yet been forwarded onto the old path. The problem of missing data is, however, more easily handled in a communication network, partly because the capability to respond to missing data packets or frames is built into most networking protocols. Networking applications have always been required to cope with the possibility of missing data. On the other hand, many network applications, especially those written before the ANSI adopted the Fibre Channel standard, do not have the capability to recognize or rectify out-of-order delivery of data, because a typical transport-layer network protocol such as TCP put data packets delivered out-of-order back in the correct order. To utilize these network applications with Fibre Channel, which routes frames using lower level protocols that do not correct for the order of delivery, a method such as that illustrated in FIG. 3 is desirable.

The hold-down period may be set to a predetermined value, or may be optimized based on information available from the routing protocol. For example, the topology database 224 of switch 200 may keep track not only of the current topology of the network, but also of the number of "hops" or intermediate switches between switch 200 and each destination of frames received. Since there is generally a limit as to how long a frame is allowed to remain in a switch before it is considered lost, the product of this maximum allowable delay and the number of hops in the old path gives an upper limit to the amount of time a frame might take to reach the destination via the old path. The hold-down period can therefore be equated to this maximum time that it may take any frame already within the old path when the topology change occurs to reach its destination.

In one embodiment of the present invention, the number of hops can be derived from the FSPF routing protocol, which forms part of the ANSI Fibre Channel standard. This number of hops is calculated as a by-product of path computation, but is not essential to the implementation of FSPF. Therefore, some Fibre Channel vendors may implement FSPF without making use of this information.

In another embodiment of the present invention, the calculation 310 of the hold-down time may additionally take into account the propagation time of the frames. The length of the links between switches can be derived from the FSPF protocol also. Since the frames typically propagate at a speed of about 5 micro-second per kilometer, the propagation time is often insignificant compared to the delay in intermediate switches. In yet another embodiment, the switch 200 may keep track of the time when the last frame entered the old path prior to the topology change. The hold-down time as determined in one of the above manners can then be reduced by the time this last frame has already spent in the old path when the topology change occurs.

Figure 4:
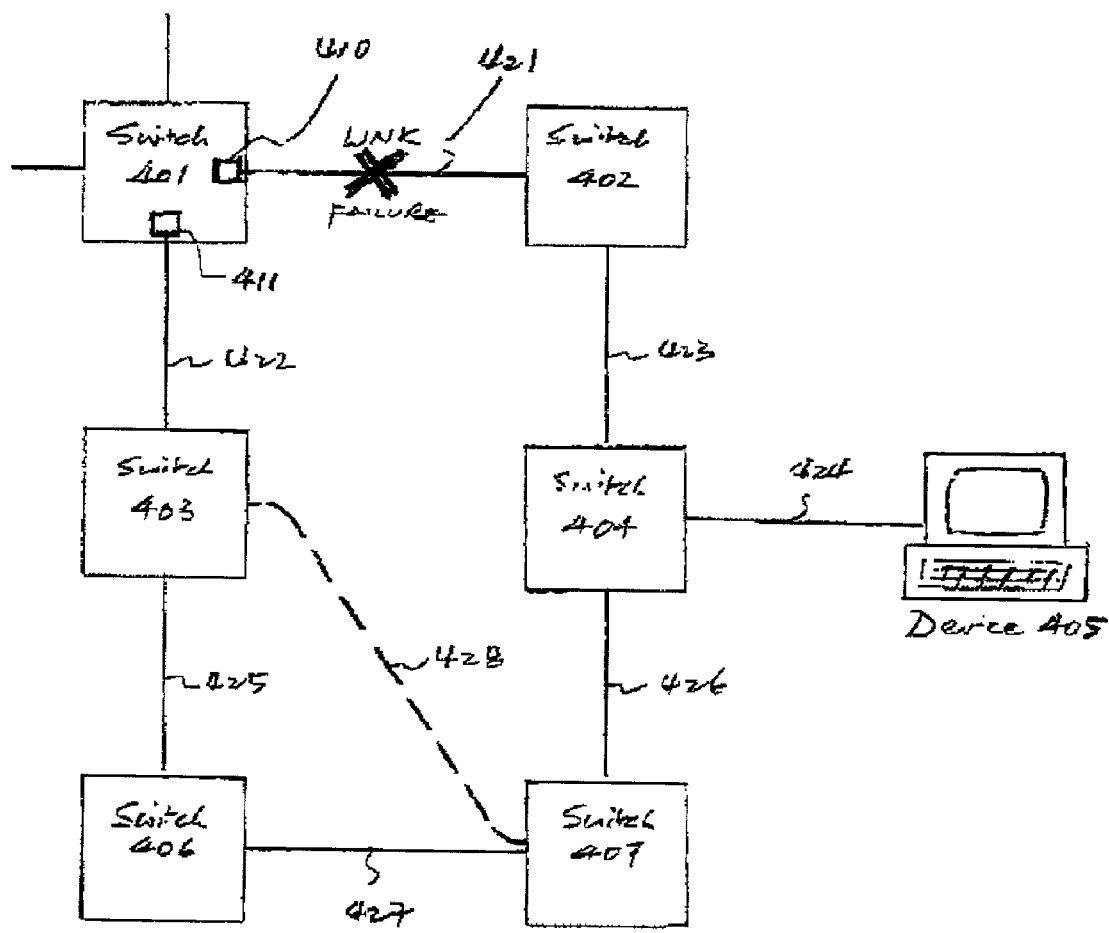
FIG. 4 is a high-level block diagram illustrating an exemplary application of an embodiment of the present invention.

The adaptive algorithm illustrated by the flowchart of FIG. 3 may be applied generally to Fibre Channel networks irrespective of the topology. A portion of an example Fibre Channel network is shown in FIG. 4, which includes six Fibre Channel switches 401, 402, 403, 404, 406 and 407, and an additional end device 405. The switches and device are connected by links 421, 422, 423, 424, 425, 426 and 427, shown in solid lines. Link 428, in phantom line, will be described in connection with a second example, to be discussed later.

Suppose the topology of the portion of the network shown is completely defined by the block diagram of switches, device and links as shown in FIG. 4. Suppose, further, that all switches share the same maximum delay time and all links are of the same length and the same cost of usage. The computation of the best path according to an FSPF-like protocol can be accomplished simply by counting and comparing the number of links in all prospective paths as shown in the block diagram. Hence, a frame received by switch 401 destined for device 405 should best take a path consisting of links 421, 423 and 424. The alternative path of links 422, 425, 427, 426 and 424 involves two more links and is therefore less efficient or feasible. The determination that the first path described is the optimal path means that all frames received by switch 401 that are destined for device 405 should use port 410 instead of port 411. This, as well as other computed paths, is reflected in the routing table 500 for the switch 401, as shown in FIG. 5(*a*).

FIG. 5(*a*) illustrates the entries of the routing table 500 for switch 401 as well as how these entries are modified in response to a topology change. The table matches each destination, listed in column 502, to a TX port, in the corresponding row of column 504. Suppose the topology change is due to a failure of link 421, as shown in FIG. 4. Any paths originating from port 410 becomes infeasible due to the topology change. As a result, the entries for destination switches 402, 404 and 407 and device 405 in the routing table 500 must be modified. In this example, the only alternative is to route the frames through port 411. The routing table 500 must be modified accordingly, i.e., the TX port entries in 504 must be replaced by those in column 506 to adapt to the new topology. It will be readily apparent to one skilled in the art that there would typically be more choices in possible paths and ports, and that the switch 401 is equipped to determined the best alternative irrespective of the number of possible paths and ports.

It is indicated in FIG. 5(*a*) that the modifications to the routing table 500 are only made after a hold-down period expires. This is an important aspect of the present invention, as discussed above. Another aspect of the present invention is illustrated by the entry for destination switch 407 in the routing table 500 of FIG. 5(*a*). The path from switch 401 to switch 407 via port 410 and links 421, 423 and 426 is equivalent in length or cost to the path via port 411 and links 422, 425 and 427. Hence, the routing table shows a load sharing arrangement under which the frames destined for switch 407 can be shared between the two paths. For the purpose of this discussion, assume that in-order delivery is maintained with an appropriate load sharing scheme. When the path via port 410 breaks down, all the frames must now be routed though port 411. Although the path through port 411 has always been one alternative according to the routing table 500, it is important to recognize that the hold-down requirement must still be observed to prevent any out-of-order delivery. This is because frames already in the path originated from port 410 may take longer to reach switch 407 than a frame routed through port 411 immediately after the topology change, as will be readily apparent to one skilled in the art in light of the above discussion.

FIG. 5(*b*), together with FIG. 4, provides another example of the application of the method illustrated in FIG. 3. In this example, assume that an additional link, 428, shown in phantom line in FIG. 4, is operative. Moreover, assume that this link is of zero length, or zero cost. As before, suppose that the cost of a path is based only on the cost to use specific links. Then, the route to device 405 may either include links 421, 423 and 424, or links 422, 428 (zero cost), 426 and 424, with the same total cost. This is reflected in the multiple TX port entries under column 514 of routing table 510.

FIG. 5(*b*) illustrates how the routing table 510 is modified in response to a topology change due to the failure of link 421, as shown in FIG. 4. In accordance with the flowchart of FIG. 3, the modification from column 514 to column 516 for the TX ports is made only after the lapse of a hold-down period. The calculation of the hold-down period in this case is, however, worth some discussion. Unlike the previous example, the entries for destination switch 404 and device 405 to routing table 510 both involve multiple same-cost paths that have different numbers of intermediate switches, or hops. For example, in the case of destination device 405, the path via port 410 involves two intermediate switches 402 and 404, whereas the path via port 411 involves three intermediate switches 403, 407 and 404. In determining the hold-down period, one must base the calculation on the maximum number of hops among equivalent paths. Hence, in this case, the hold-down period equals the product of the maximum number of hops, or three, and the delay possible in each switch, assumed uniform over all switches in the Fibre Channel network.

As will be readily apparent to one skilled in the art, the method described above can be employed in each switch upstream of the topology change. By "upstream," we mean any switch that includes a routing table entry which utilizes the link or intermediate switch that fails or becomes not cost-effective. By way of example, a path from switch 403 to switch 402 in FIG. 4 is affected by the topology change due to the failure of link 421. In this respect, switch 403 is upstream of the topology change and should respond to it using the steps described above according to the present invention. Hence, a switch is affected by, or is upstream of, a topology change if it needs to change one or more routing table entries in response to the change.

The above concept can also be utilized to further refine the calculation of the hold-down period. For example, in one embodiment of the present invention, the hold-down period is computed from the number of intermediate switches downstream of a link failure. This is because any frame within an old path but upstream of the link which fails has no chance to ever reach the destination switch or device.

The above describes just some of many alternate embodiments. Accordingly, the present invention is intended to embrace all such alternatives, modifications and variations as fall within the spirit and scope of the appended claims and equivalents.

What is claimed is:

1. A method for in-order delivery of frames in a Fibre Channel communication network system from a first communication device to a destination communication device, after a topology change in the communication network system has rendered infeasible a first path from the first communication device to the destination communication device, the method comprising:

responsive to the topology change, deactivating the first path;

determining a new path from the first communication device to the destination communication device; and after the lapse of a hold-down period, activating the new path, wherein deactivating the first path comprises:

clearing a transmit queue within the first communication device corresponding to the first path; and canceling an entry to a routing table for the first communication device directing frames destined for the destination communication device to the first path.

2. The method of claim 1, wherein the first communication device is a Fibre Channel switch.

3. The method of claim 1, wherein the destination communication device is an end device.

4. The method of claim 1, wherein the topology change comprises a failure of a link within the first path.

5. The method of claim 1, wherein clearing the transmit queue corresponding to the first path further comprises dropping all frames submitted to the queue prior to the topology change for transmission via the first path.

6. The method of claim 1, wherein canceling the entry to the routing table further comprises dropping all frames received by the first communication device during the hold-down period destined for the destination communication device.

7. The method of claim 1, wherein activating the new path at the first communication device comprises:

adding an entry to a routing table for the first communication device directing frames destined for the destination communication device to the new path.

8. The method of claim 1, wherein the new path is the most feasible of all available paths from the first communication device to the destination communication device after the topology change.

9. The method of claim 8, wherein the feasibility of the first path and of the new path is determined based on costs of using the paths.

10. The method of claim 1, wherein the hold-down period is a predetermined period of time.

11. A method for in-order delivery of frames in a Fibre Channel communication network system from a first communication device to a destination communication device, after a topology change in the communication network system has rendered infeasible a first path from the first communication device to the destination communication device, the method comprising:

responsive to the topology change, deactivating the first path;

determining a new path from the first communication device to the destination communication device; and after the lapse of a hold-down period, activating the new path, wherein the hold-down period is a maximum allowable time the destination communication device can wait for a data frame transmitted from the first communication device before having to consider it missing.

12. A method for in-order delivery of frames in a Fibre Channel communication network system from a first communication device to a destination communication device, after a topology change in the communication network system has rendered infeasible a first path from the first communication device to the destination communication device, the method comprising:

responsive to the topology change, deactivating the first path;

determining a new path from the first communication device to the destination communication device;

calculating the maximum time required for data frames within the first path immediately prior to the topology change to reach the destination communication device; and after the lapse of a hold-down period, activating the new path, wherein the hold-down period is the maximum time required for data frames within the first path immediately prior to the topology change to reach the destination device.

13. The method of claim 12, wherein calculating the maximum time required for data frames within the first path immediately prior to the topology change to reach the destination communication device further comprises:

identifying all intermediate switches within the first path between the first communication device and the destination communication device;

determining, for each intermediate switch within the first path, a maximum delay a data frame may experience within the intermediate switch; and summing the maximum delays in all intermediate switches within the first path between the first communication device and the destination communication device to obtain the maximum time required for data frames within the first path immediately prior to the topology change to reach the destination communication device.

14. The method of claim 12, wherein calculating the maximum time required for data frames within the first path immediately prior to the topology change to reach the destination communication device further comprises:

determining a number of intermediate switches within the first path between the first communication device and the destination communication device;

determining a maximum delay a data frame may experience in any intermediate switch within the first path; and utilizing the number of intermediate switches and the maximum delay to compute the maximum time required for data frames within the first path immediately prior to the topology change to reach the destination communication device.

15. The method of claim 14, wherein the number of intermediate switches within the first path between the first communication device and the destination communication device is determined based on information generated by the Fabric Shortest Path First Protocol.

16. The method of claim 14, wherein the maximum delay a data frame may experience in any intermediate switch within the first path is specified for the Fibre Channel communication network before the topology change.

17. The method of claim 14, wherein the maximum time required for data frames within the first path immediately prior to the topology change to reach the destination communication device is calculated as the product of the number of intermediate switches and the maximum delay.

18. The method of claim 4, wherein the maximum time required for data frames within the first path immediately prior to the topology change to reach the destination communication device is calculated as the product of the number of intermediate switches and the maximum delay, reduced by the amount of time the last frame entering the first path immediately prior to the topology change has already spent in the first path.

19. The method of claim 12, wherein calculating the maximum time required for data frames within the first path immediately prior to the topology change to reach the destination communication device further comprises:

determining a number of intermediate switches within the first path between the first communication device and the destination communication device;

determining a maximum delay a data frame may experience in any intermediate switch within the first path;

determining a propagation time for a data frame to travel from the first communication device to the destination communication device excluding delays at intermediate switches; and utilizing the number of intermediate switches, the maximum delay and the propagation time to compute the maximum time required for data frames within the first path immediately prior to the topology change to reach the destination communication device.

20. The method of claim 12, wherein the topology change comprises a failure of an element of the Fibre Channel communication network, and wherein calculating the maximum time required for data frames within the first path immediately prior to the topology change to reach the destination communication device further comprises:

determining a number of intermediate switches within the first path between the first communication device and the destination communication device downstream of the failed element;

determining a maximum delay a data frame may experience in any intermediate switch within the first path; and utilizing the number of downstream intermediate switches and the maximum delay to compute the maximum time required for data frames within the first path immediately prior to the topology change to reach the destination communication device.

21. A method for in-order delivery of frames in a Fibre Channel communication network system from a first communication device to a destination communication device, after a topology change in the communication network system has rendered infeasible one or more of a plurality of existing paths from the first communication device to the destination communication device, the method comprising:

responsive to the topology change, deactivating the plurality of existing paths;

determining at least one feasible path from the first communication device to the destination communication device;

calculating a maximum time required for data frames within the plurality of existing paths immediately prior to the topology change to reach the destination communication device; and after the lapse of a hold-down period, activating the at least one feasible path, wherein the hold-down period is the maximum time required for data frames within the plurality of existing paths immediately prior to the topology change to reach the destination device.

22. The method of claim 21, wherein calculating the maximum time required for data frames within the plurality of existing paths immediately prior to the topology change to reach the destination communication device further comprises:

determining a maximum number of intermediate switches between the first communication device and the destination communication device within any one of the plurality of existing paths;

determining a maximum delay a data frame may experience in any intermediate switch within the plurality of existing paths; and utilizing the maximum number of intermediate switches and the maximum delay to compute the maximum time required for data frames within the plurality of existing paths immediately prior to the topology change to reach the destination communication device.

23. A system for in-order delivery of frames in a Fibre Channel communication network from a first communication device to a destination communication device, after a topology change in the communication network has rendered infeasible a first path from the first communication device to the destination communication device, the system comprising:

a path computation module for determining a new path from the first communication device to the destination communication device;

a timer for keeping track of the time lapsed since the topology change;

a processing module for calculating a maximum time required for data frames within the first path immediately prior to the topology change to reach the destination communication device; and a routing logic module for, responsive to the topology change, deactivating the first path, and after the lapse of a hold-down period, activating the new path, wherein the hold-down period is the maximum time required for data frames within the first path immediately prior to the topology change to reach the destination device.

24. The system of claim 23, wherein the routing logic module further comprises:

a routing table for storing at least one path for routing frames to each destination communication device; and a topology database for storing the current state of the topology of the Fibre Channel network, including information concerning the paths stored in the routing table.

25. A computer program product for in-order delivery of frames in a Fibre Channel communication network system from a first communication device to a destination communication device, after a topology change in the communication network system has rendered infeasible a first path from the first communication device to the destination communication device, the product comprising:

a computer usable medium;

program code for, responsive to the topology change, deactivating the first path;

program code for determining a new path from the first communication device to the destination communication device; and program code for, after the lapse of a hold-down period, activating the new path, wherein the hold-down period is a maximum allowable time the destination communication device can wait for a data frame transmitted from the first communication device before having to consider it missing.

* * * * *